US005896146A

United States Patent [19]

Murata et al.

[11] Patent Number: 5,896,146

[45] Date of Patent: Apr. 20, 1999

[54] TIME DIVISION DRIVE RECORDING APPARATUS AND METHOD

[75] Inventors: Takayuki Murata, Kawasaki; Hiroshi Fukui, Yokosuka; Shinichi Omo, Kawasaki; Akira Kuronuma, Kawasaki; Masahiko Umezawa, Kawasaki, all of Japan

[73] Assignee: Canon Kabushiki Kaisha, Tokyo, Japan

[21] Appl. No.: 08/617,122

[22] Filed: Mar. 18, 1996

[30] Foreign Application Priority Data

Mar. 20, 1995 [JP] Japan .................................. 7-060835

[51] Int. Cl.[6] .......................... B41J 2/155; G01D 15/10

[52] U.S. Cl. ............................... 347/42; 347/57; 347/182

[58] Field of Search ....................... 346/141; 347/13–15, 347/12, 17, 42, 43, 18, 57, 40, 41, 182–183

[56] References Cited

U.S. PATENT DOCUMENTS

| | | | |
|---|---|---|---|
| 4,313,124 | 1/1982 | Hara | 547/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,723,129 | 2/1988 | Endo et al. | 347/56 |
| 4,740,796 | 4/1988 | Endo et al. | 347/56 |
| 5,173,717 | 12/1992 | Kishida et al. | 347/13 |
| 5,266,965 | 11/1993 | Komai et al. | 347/12 |
| 5,353,051 | 10/1994 | Katayama et al. | 347/13 |
| 5,357,268 | 10/1994 | Kishida et al. | 347/13 |
| 5,539,433 | 7/1996 | Kawai et al. | 346/141 |

FOREIGN PATENT DOCUMENTS

| | | |
|---|---|---|
| 54-056847 | 5/1979 | Japan . |
| 59-123670 | 7/1984 | Japan . |
| 59-138461 | 8/1984 | Japan . |
| 60-071260 | 4/1985 | Japan . |

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

A recording apparatus records an image by driving plural recording elements in blocks, into which the plural recording elements are divided. The plural blocks are divided into plural groups, each group having more than one block. A driving circuit drives each of the blocks independently. The driving circuit effects recording with high resolution or low resolution by respectively driving plural groups at a different timing in a first mode and driving the plural groups at a same timing in a second mode.

38 Claims, 12 Drawing Sheets

● DOTS DURING PULSES 1 TO 8

⊘ DOTS DURING PULSES 9 TO 16

● DOTS DURING PULSES 1 TO 8

⊘ DOTS DURING PULSES 9 TO 16

TIME DIVISION DRIVE RECORDING APPARATUS AND METHOD

BACKGROUND OF THE INVENTION

1. Field of the Invention

This invention relates to a time division drive recording apparatus and method. More specifically, this invention is suitable for the time division drive recording apparatus and method using an ink jet recording system that can record with high accuracy and at high speed.

2. Description of the Related Art

As copying apparatuses, information processing apparatuses such as word processors and computers, and communication apparatuses have become more and more widely used, image forming apparatuses which perform digital image recording using an ink jet system are rapidly becoming widely used. In such a recording apparatus, it is common to use a recording head (multi-head) in which plural recording elements are integrally arranged to improve recording speed. Ink discharge openings and liquid paths are integrally arranged to correspond to recording elements in the case of an ink jet system.

Printing a monochromatic high resolution image or a color image requires good coloring, tonality, uniformity and so on.

In a recording apparatus of the bubble jet system which discharges ink using thermal energy, among many kinds of ink jet recording apparatuses, a heat element is controlled by applying plural electric pulses to the heat element. By applying plural electric pulses or, in some cases, changing the width thereof, an ink discharge condition can be kept constant so printing quality can be maintained constant regardless of outside environmental conditions (e.g., temperature).

However, recently in an ink jet system not only high printing quality but also high recording speed are expected.

To control the heat element by applying plural pulses to improve printing quality requires much time for control because one dot must be formed by applying plural pulses, so it is a disadvantage in achieving high recording speeds.

A driver structure of conventional printing heads 50A to 50D is shown in FIG. 4. In FIG. 4, the driver structure for black recording head 50A is shown in detail, but the driver structures for cyan head 50B, magenta head 50C, and yellow head 50D are similar. Black printing data BKSi (CSi, MSi, YSi for the other heads) is transferred to a shift register 51 and it is once stored in a latch 52. By performing AND (logical product) of the data stored in the latch 52, common signals BEi1*, BEi2*, BEi3* and BEi4* commonly supplied to all heads and heat signal BkENB* (CENB*, MENB* and YENB* for the other heads), only designated heaters 54 can be driven by a transistor array 53. The symbol "*" designates low active.

Drive timing in a conventional recording apparatus is shown in FIGS. 5A–5H. FIGS. 5A–5H show that common signals (BEi1*, BEi2*, BEi3*, BEi4*) and heat signals (BkENB*, CENB*, MENB*, YENB*) are driven in a time division manner and a number of the heaters heated at the same time is limited in order to reduce consumption of electric power in an actual drive. As mentioned above, the heat signal comprises plural pulses to maintain printing quality.

In FIGS. 5E–5H, the manner of controlling by two pulses is shown. Each heat signal comprises a preheat pulse and a main heat pulse between which an interval period exists. The main heat pulse warms a heater for discharging ink by forming a bubble. The preheat pulse, however, is of insufficient duration to discharge the ink, but rather preheats the ink to control a bubble forming area.

However, this method takes a relatively large length of time because of the duration of the preheat period and the interval period, in comparison with a head drive method in which temperature control is not performed. As a result, in this method the drive time as a whole becomes too long as to diminish the high-speed drive of a printer. Moreover, it is desirable to select high resolution recording or standard resolution recording as needed.

SUMMARY OF THE INVENTION

One object of the invention is to provide a time division drive recording apparatus and method which can shorten a drive time of a recording head and can record at high resolution.

It is another object of the invention to provide a time division drive recording apparatus and method which can select high resolution recording or standard resolution recording.

According to one aspect of the present invention there is provided a recording head with a driving circuit and comprising plural recording elements divided into plural blocks and the plural blocks being divided into plural groups, each group having more than one block. The driving circuit can drive each of the blocks independently. The driving circuit drives the plural groups at a different timing in a first mode and drives the plural groups at the same timing in a second mode.

According to a further aspect of the present invention there is provided a recording head cartridge including a recording head and a container. The recording head is operable in first and second modes and includes plural recording elements divided into plural blocks and the plural blocks are divided into plural groups. Each group has more than one block. The driving circuit drives each of the plural blocks independently. The driving circuit drives the plural groups at a different timing in the first mode and drives the plural groups at a same timing in the second mode. Recording is effected by discharging a recording liquid from a liquid path by using thermal energy. The container holds the recording liquid to be supplied to the liquid path.

According to another aspect of the present invention there is provided a recording apparatus for recording an image using a recording head having plural recording elements divided into plural blocks and the plural blocks being divided into plural groups, each group having more than one block. A driver can drive each of the plural blocks independently. A drive controller controls the driver to drive the plural groups at a different timing in a first mode and to drive the groups at the same timing in a second mode.

According to yet another aspect of the present invention there is provided a method for recording an image using a recording head having plural recording elements divided into plural blocks and the plural blocks being divided into plural groups, each group having more than one block. A providing step provides a driver for driving each of the plural blocks independently. A first controlling step controls the driver to drive the plural groups at a different timing in a first mode. A second controlling step controls the driver to drive the plural groups at the same timing in a second mode.

The individual components shown in outline or designated by blocks in the drawings are all well-known in the image recording arts and their specific construction and operation are not critical to the operation or best mode for carrying out the invention.

DETAILED DESCRIPTION OF THE PREFERRED EMBODIMENT

The preferred embodiment of the present invention will now be described with reference to the drawings.

Figure 1:
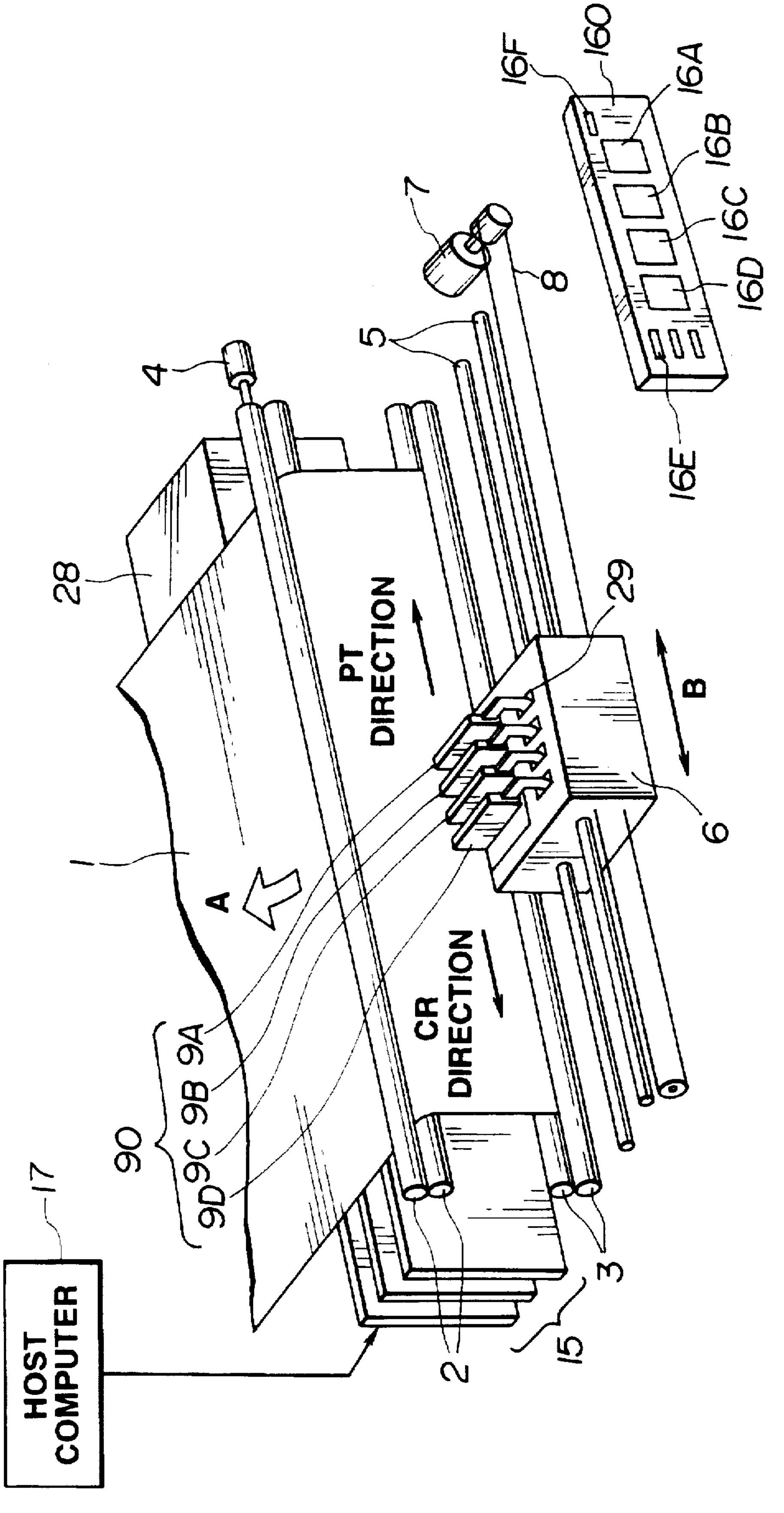
FIG. 1 is a perspective view showing structure of a color ink jet recording apparatus adaptable to the present invention.

FIG. 1 is a block diagram showing structure of an ink jet recording apparatus adaptable to the present invention.

In FIG. 1, a recording medium 1 such as paper or a plastic sheet is supported by two pairs of conveyance rollers 2, 3, with one pair positioned above and the other pair positioned below a recording area. The recording medium 1 is conveyed by the pair of conveyance rollers 2 driven by a sheet feeding motor 4 in the direction of arrow A. In front of the pairs of conveyance rollers 2, 3, guide shafts 5 are provided parallel therewith. Along the guide shafts 5, a carriage 6 is scanned in the forward and reverse directions of arrow B by a wire 8 driven by a carriage motor 7.

On the carriage 6, an ink jet recording head 90 is mounted. The recording head 90 comprises four heads for color image recording arranged along a carriage scanning direction. The four heads comprise a black head 9A, a cyan head 9B, a magenta head 9C and a yellow head 9D respectively corresponding to ink colors of black (Bk), cyan (C), magenta (M), and yellow (Y). On the front surface of each recording head 9, in other words on a surface facing a recording surface of the recording medium 1, at predetermined intervals (for example 0.8 mm), ink discharge sections, in which plural ink discharge openings (for example, numbering 48 or 64) are arranged in a row in a direction different from the carriage scanning direction, are provided.

Figure 2:
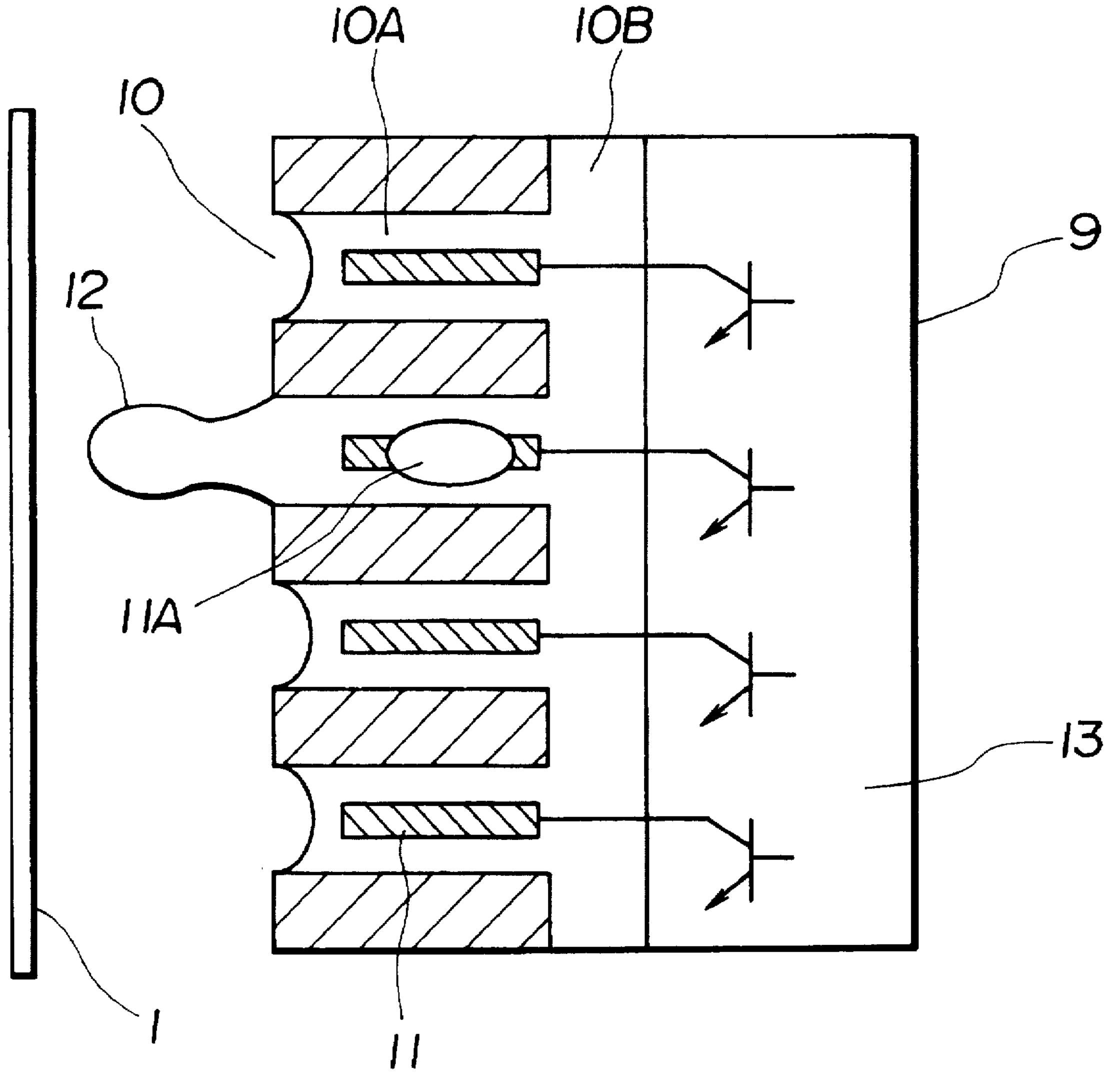
FIG. 2 is a schematic illustration showing a vertical sectional view of a part of an ink discharge section of the recording head.

FIG. 2 is a schematic illustration showing a vertical sectional view of a part of an ink discharge section of one of the recording heads 90, with each of the recording heads 9A to 9D being of a similar construction.

In FIG. 2, plural ink discharge openings 10 are formed at a predetermined pitch on the surface facing the recording medium 1. Electro-thermal converters (heat resistors or the like) 11 provided correspondingly to each ink discharge opening 10 are driven (heated) based on recording information, to effect a film boiling phenomenon in ink and form a bubble 11A. Pressure from the bubble generation causes the ink to discharge in the form of a flying ink droplet 12 which lands on the recording medium 1, so as to effect recording as a constituent of a dotted pattern.

A heat driver 13 that switches on and off a current application to the electro-thermal converter is provided for each recording head 90. A circuit board of a drive circuit (driver) 29 to drive as mentioned above is provided on the carriage 6. Reference numeral 10A is a liquid path and 10B is a common liquid chamber. The ink is supplied to the liquid path 10A through the common liquid chamber 10B from an ink tank (not shown) filled with the ink.

A control section including an engine control circuit (CPU) of the recording apparatus, ROM and RAM provided therewith receives a command signal and data signal (recording information) from a controller of a host computer 17 and drives a drive source such as a motor based on the signals, and drives an electro-thermal converter 10A of each of recording heads 9A to 9D through the heat driver 13.

Both a key setting section including online/offline select key 16A, line feed key 16B, form feed key 16C, recording mode select key 16D and so on, and an indicator section including plural warning lamps 16E and power supply lamp 16F are provided on an operation panel 160 which is attached to the exterior of a housing (not illustrated) of the recording apparatus.

Figure 3:
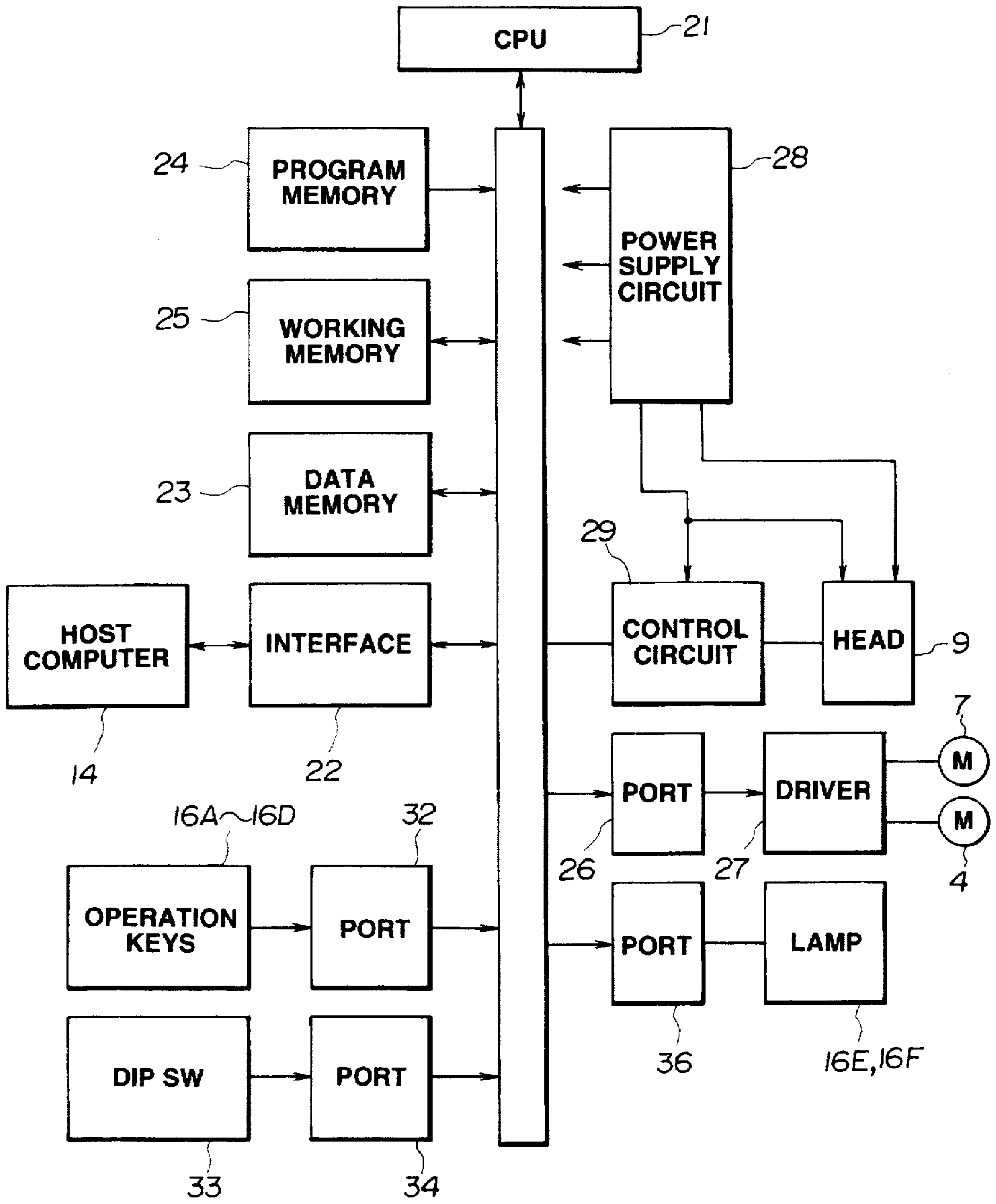
FIG. 3 is a block diagram showing a control system of the color ink jet recording apparatus shown in FIG. 1.

FIG. 3 is a block diagram showing a control system of the color ink jet recording apparatus shown in FIG. 1.

In FIG. 3, the CPU 21 is connected to the host computer 14 through an interface 22, and controls a recording operation based on both the command signal (command) and recording information signal read in a data memory 23 from a controller of the host computer 14, and the program printing command data stored in a program memory 24, working memory 25 and so on. CPU 21 controls the carriage motor 7 and the sheet feeding motor 4 through an output port 26 and a motor driver 27, and controls the recording head 9 through the control circuit 29 based on the recording information stored in the data memory 23 to record.

An output from each of operation keys 16A to 16D (FIG. 1) on the operation panel 160 mentioned above is transmitted to the CPU 21 through an input port 32. Moreover, a control signal is supplied through an output port 36 from the CPU 21 to the warning lamps such as the alarm lamps 16E and the power supply lamp 16F.

Reference numeral 33 represents a timer provided on a control board and is connected to an interrupt port of the CPU 21 through an input port 34.

From a power supply circuit 28, logic drive voltage VCC (for example, 5V) to drive a control logic circuit, motor drive voltage VM (for example, 30V), reset voltage RESET, heat voltage VH (for example, 25V) to heat the electro-thermal converter 11 of the recording head 90 and backup voltage VDDH to protect the recording head 9 are output.

The heat voltage VH is applied to the recording head 9 and backup voltage VDDH is applies to the head control circuit 29 and the recording head 90.

Figure 4:
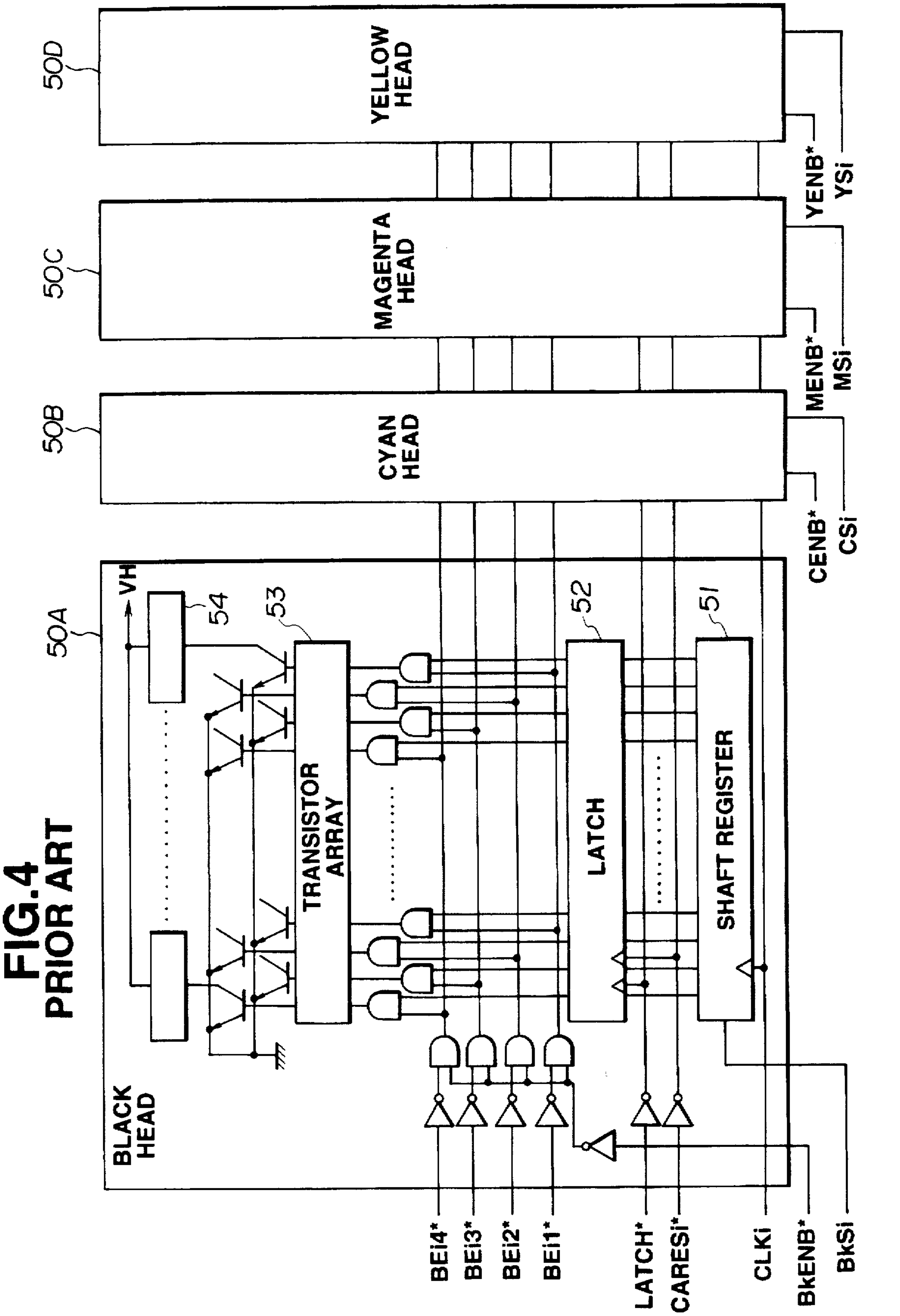
FIG.4 PRIOR ART
FIG. 4 is a block diagram showing a driving structure of a conventional recording head.
Figures 5A, 5B, 5C, 5D, 5E, 5F, 5G, 5H:
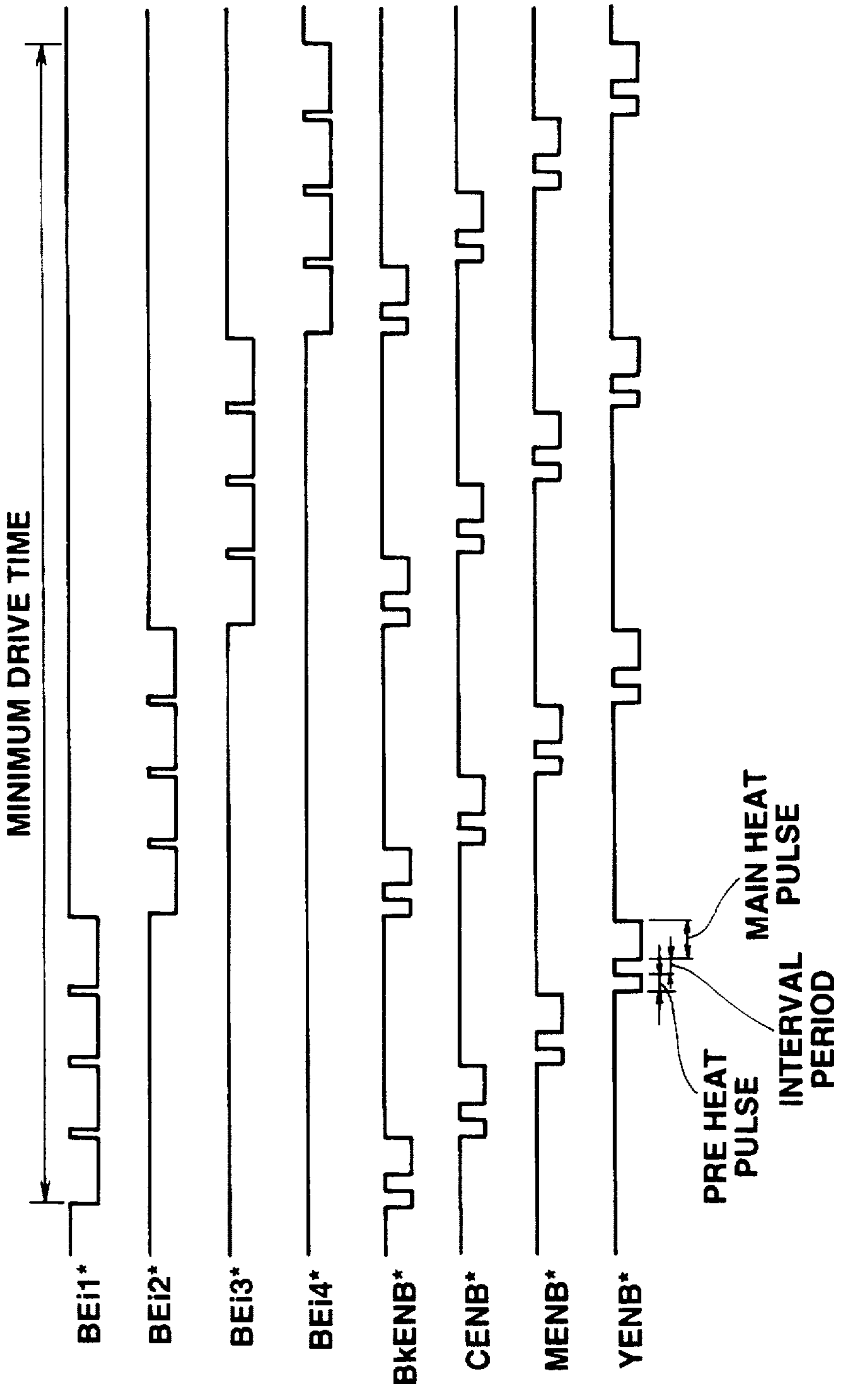
FIG.5A PRIOR ART
FIG.5B PRIOR ART
FIG.5C PRIOR ART
FIG.5D PRIOR ART
FIG.5E PRIOR ART
FIG.5F PRIOR ART
FIG.5G PRIOR ART
FIG.5H PRIOR ART
FIGS. 5A–5H comprise a drive timing chart of a conventional recording apparatus.

As mentioned above, the conventional method described with reference to FIGS. 4 and 5 takes much time because of the preheat period and the interval period accompanying therewith in comparison with the head drive method in which temperature control (preheat control) is not performed, so the conventional method as a whole becomes long and it is disadvantageous in achieving high-speed drive of a printer. The manner for solving this problem, which is a premise of this embodiment, will be explained referring to FIG. 6.

Figure 6:
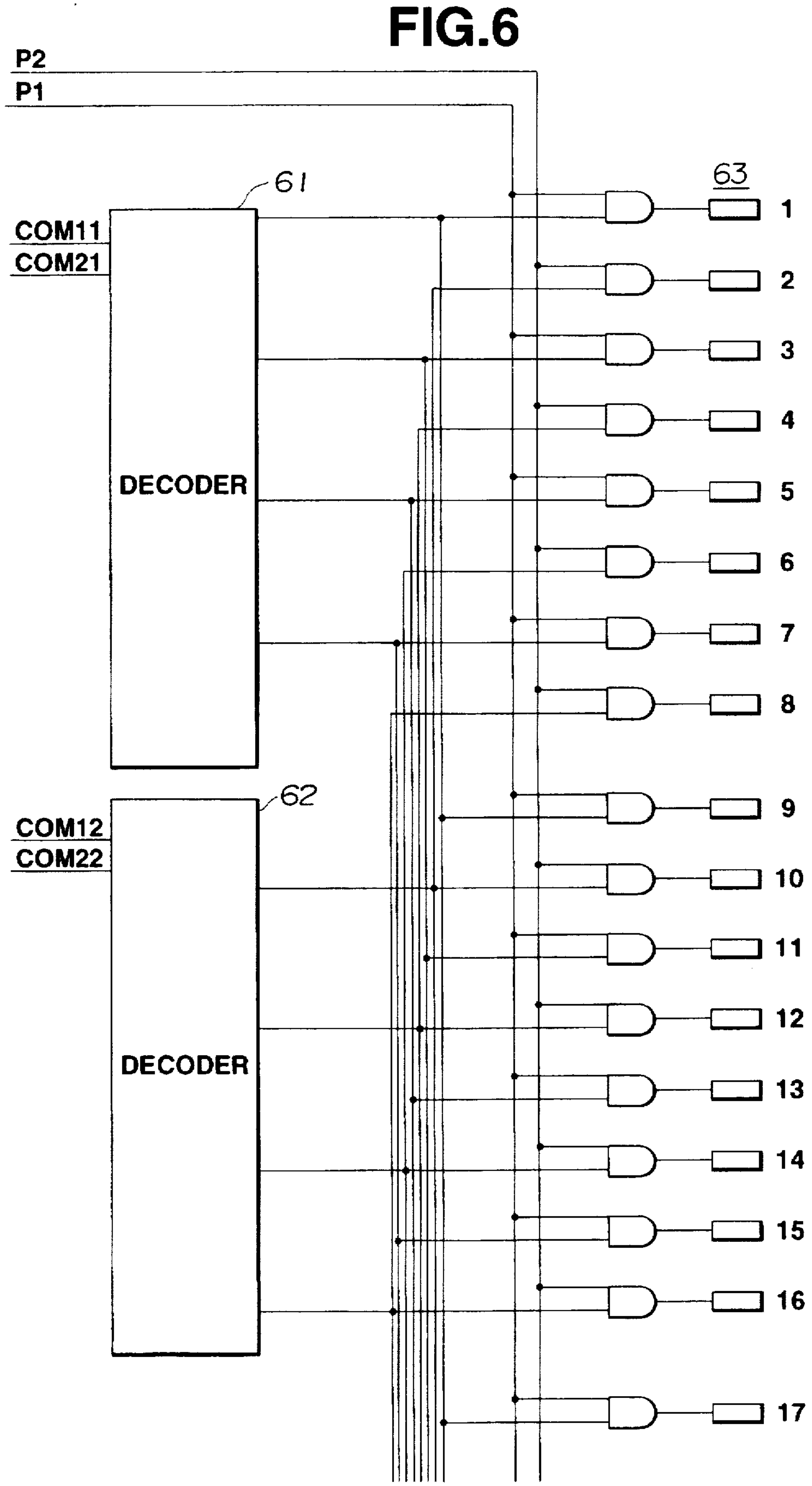
FIG. 6 is a block diagram of a recording head according to the present invention.

FIG. 6 shows structure of a driver housed in the recording head. This structure enables the apparatus to print at a high speed while it drives to control the temperature of the recording head using two or more pulses. In FIG. 6, plural (here, 2) decoders 61, 62 are respectively connected to the corresponding heaters 63 (here, odd numbered heaters and even numbered heaters). Each of the heaters (odd numbered heaters) according to common signals COM11, COM12 and heat signal P1 and the heaters (even number heaters) according to common signals COM21, COM22 and heat signal P2 can be driven independently. The line to supply the record data (recording information) is omitted to simplify the explanation.

Figures 7A, 7B, 7C, 7D, 7E, 7F, 7G, 7H, 7I, 7J, 7K, 7L:
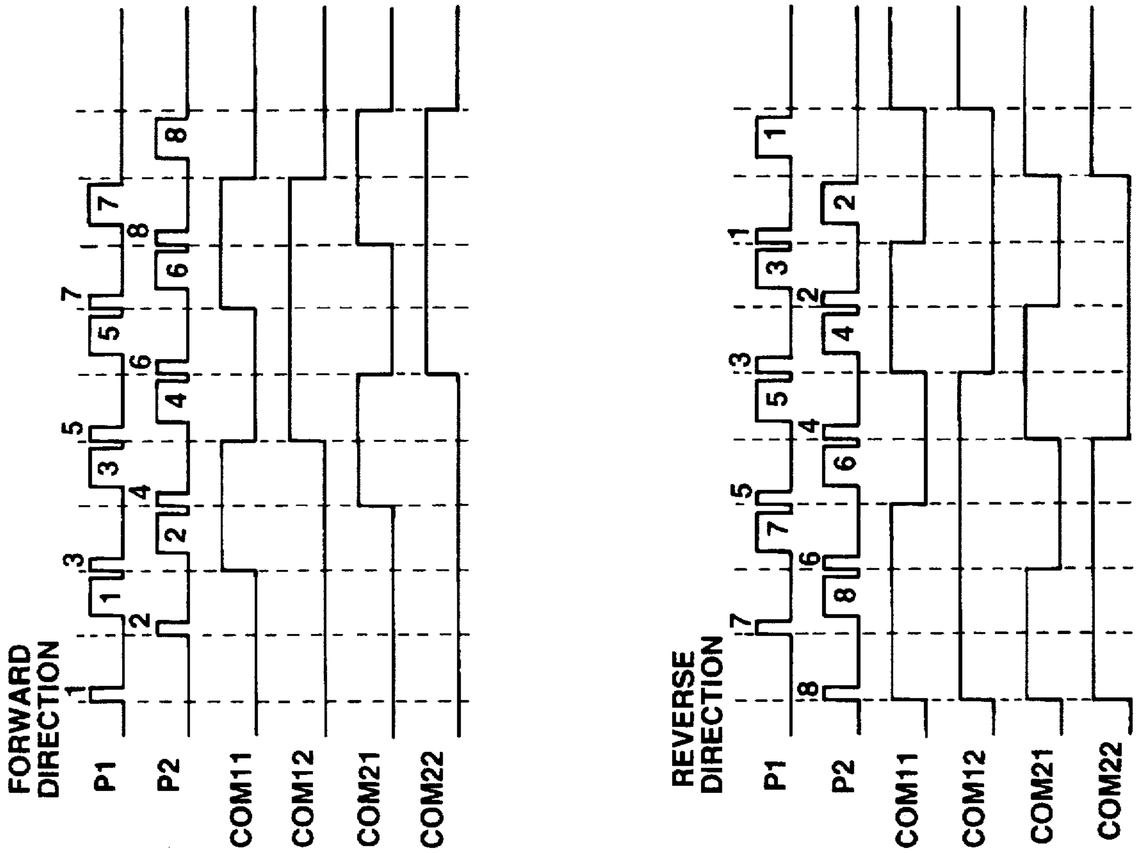
FIGS. 7A–7L comprise a drive timing chart for the recording head shown in FIG. 6.

According to the structure, each of the odd numbered heaters and the even numbered heaters can be driven independently, so the head can be driven at a timing as shown in FIG. 7. FIG. 7 is a timing chart showing the independent drive of the heat signals P1, P2 to print in a forward direction (PT direction in FIG. 1) and reverse direction (CR direction in FIG. 1).

Two or more pulses to perform temperature control can be generated by using each of signals P1, P2 in spite of its simple iteration. By controlling each of signals P1, P2 independently, the preheat pulse and the main heat pulse can be driven during the interval period between another preheat pulse and another main heat pulse. The above mentioned structure can minimize the minimum drive time needed to drive in spite of control by plural pulses and can easily drive at a high speed. As shown in FIG. 7, the heaters can be easily driven in reverse order in the reverse direction driven by reversely applying the common signals in the forward driving order.

Although the example that a drive block is divided into two to be driven has been explained, the drive block may be divided into more than two.

The above mentioned structure enables plural blocks to be driven independently and to drive with plural pulses efficiently, so it is possible to print at a high speed.

Next, another embodiment of the invention will be explained.

In this embodiment, plural drivers are provided on a head unit and they are driven simultaneously, so it is possible to print at a double resolution.

Figure 8A:
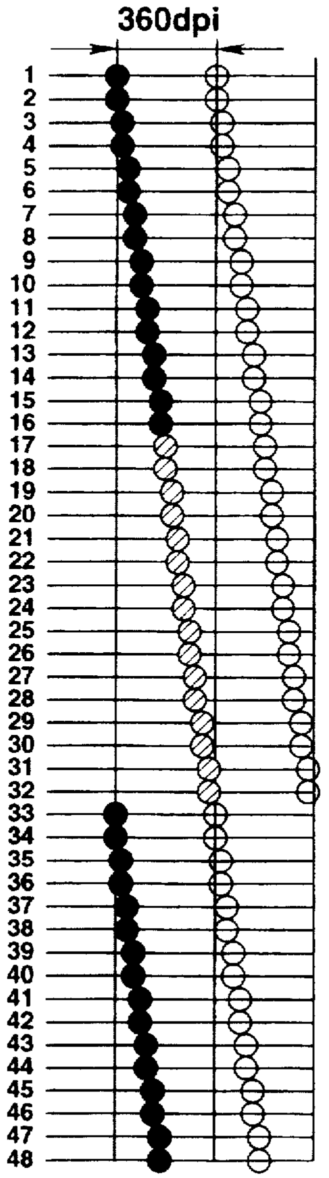
FIGS. 8(A) and 8(B) are schematic views showing ink landed positions of a recording head of an embodiment of the present invention.
Figure 8B:
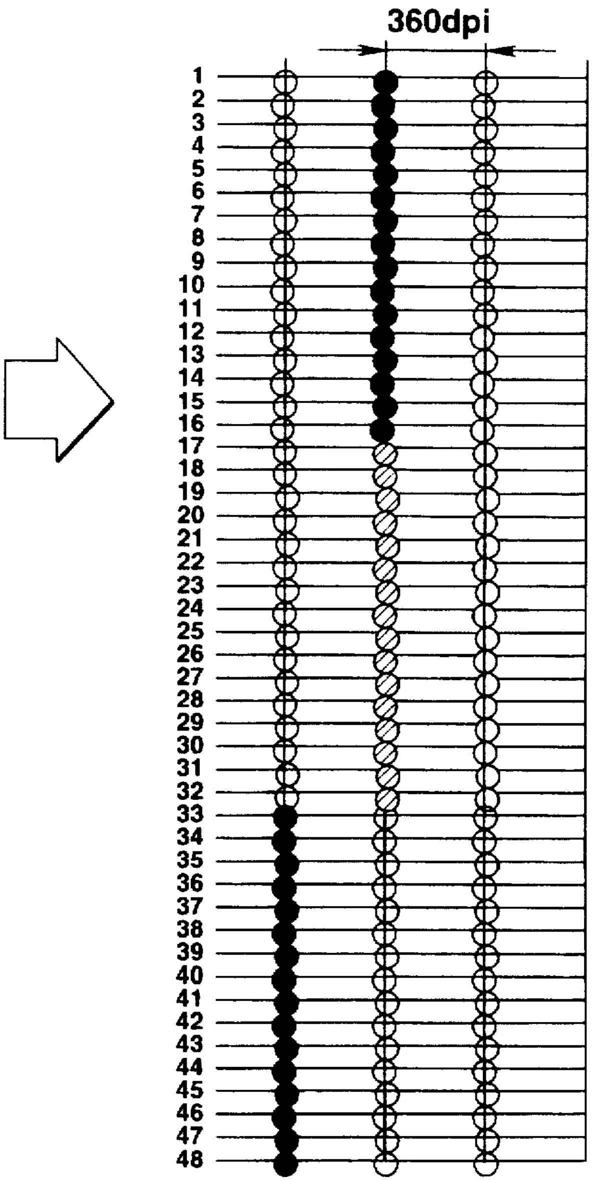

In the recording apparatus of the structure mentioned above, a carriage is moved to the right and left, and a recording head is driven by triggering at any position to print. In the apparatus of this embodiment, the landed position of a dot (ink) ejected in a subsequent timing will be shifted from the landed position of a dot (ink) ejected in a previous timing in order to drive the printing head in the time division manner while the carriage is moving. The head is inclined beforehand in this embodiment to line up the landed positions of printed dots. The control to line up the landed positions of the printed dots in the embodiment will be shown in FIGS. 8(A) and 8(B). FIG. 8(A) shows landed spots of printing dots on the recording medium without correction of the recording head. In FIGS. 8(A) and 8(B), vertical lines represent ideal landed positions. In FIGS. 8(A) and 8(B), heating 32 nozzles, which are double the number of nozzles shown in FIG. 6, will be explained.

Figure 9:
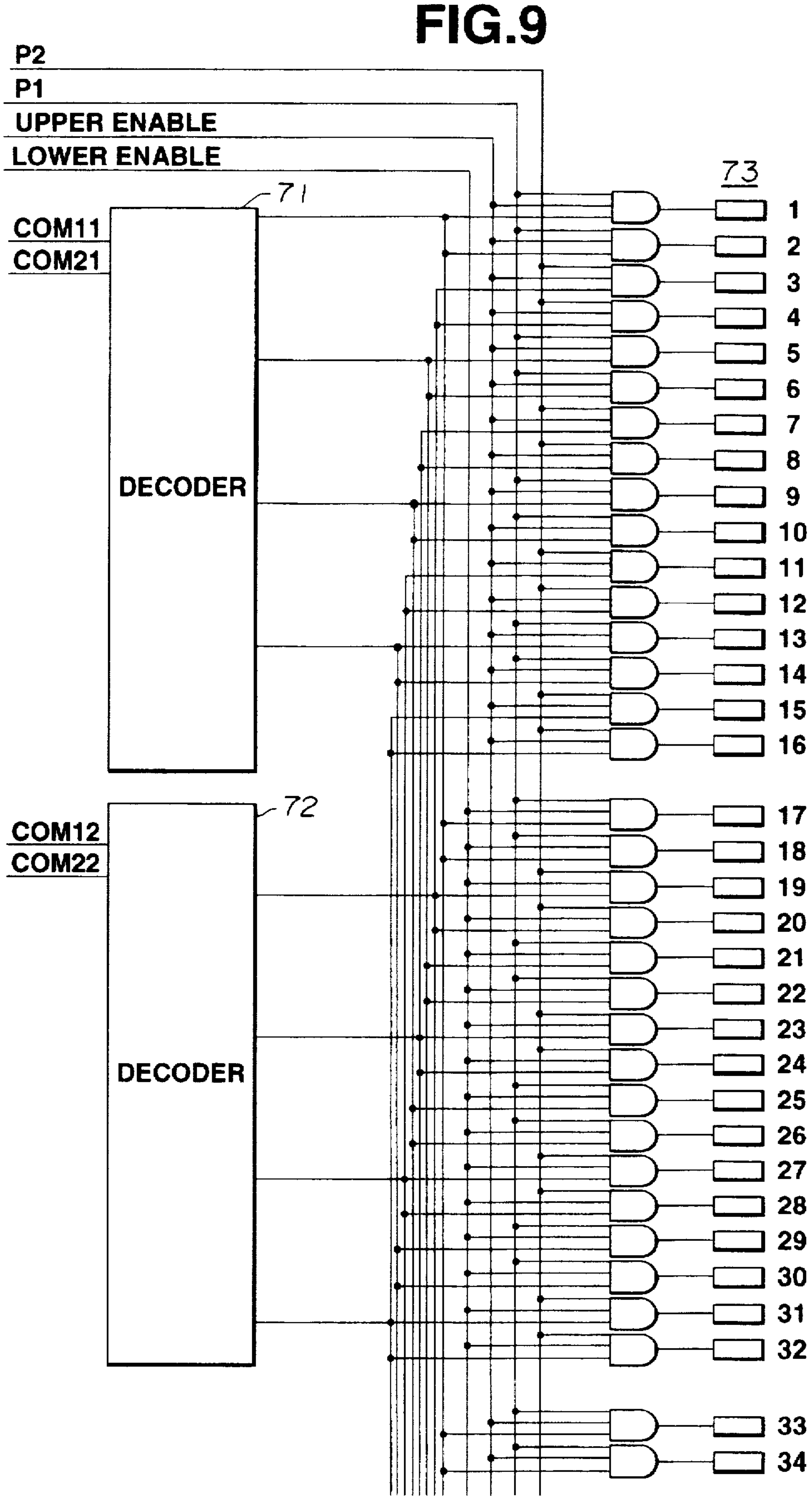
FIG. 9 is a block diagram showing structure of a recording head of an embodiment according to the present invention.

In FIGS. 8(A) and 8(B), the printing head comprises 64 total nozzles instead of 32 nozzles. The 1st and 2nd nozzles and the 33rd and 34th nozzles are heated at the same time to discharge ink. An inside driver circuit of the head is structured to enable the 1st, 2nd, 33rd and 34th nozzles (heaters) to be driven in common as shown in FIG. 9. The drive timing will be shown in FIGS. 10A–10R.

Figures 10A, 10B, 10C, 10D, 10E, 10F, 10G, 10H, 10I, 10J, 10K, 10L, 10M, 10N, 10O, 10P, 10Q, 10R:
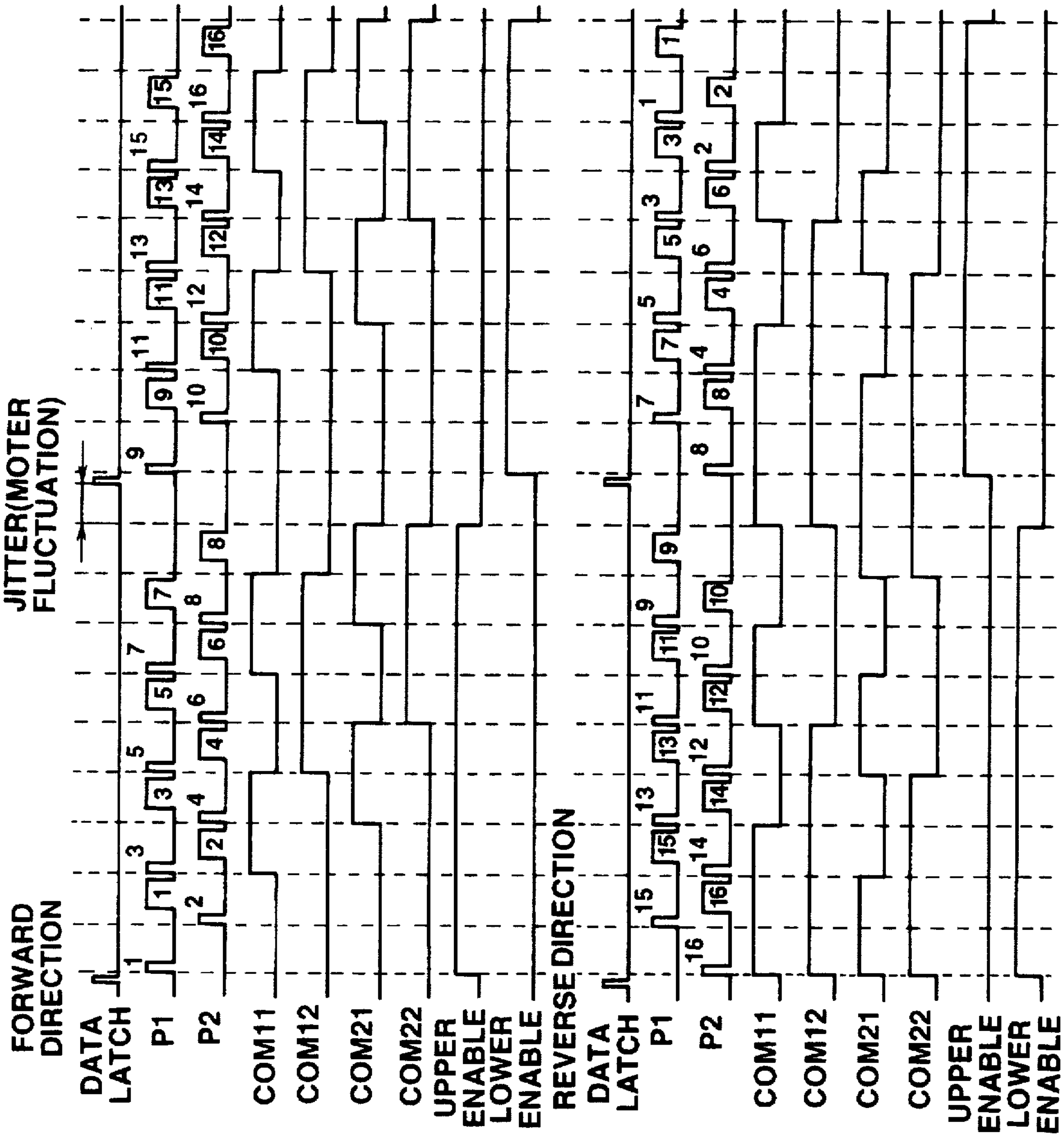
FIGS. 10A–10R comprise a standard drive timing chart for the recording head shown in FIG. 9.

A driver circuit shown in FIG. 9 independently drives two systems by signals P1, P2 and signals COM11, COM12, COM21, COM22 which are input in the decoders 71, 72 as in FIG. 6. An UPPER ENABLE signal enables the 1st to 16th and 33rd to 48th heaters 73 to be driven, and a LOWER ENABLE signal enables the 17th to 32nd and 49th to 64th heaters 73 to be driven. Those two signals can be driven independently. Drive timing in the first mode which is recording at standard resolution is shown in FIGS. 10A–10R. In FIGS. 10B, 10C, 10K and 10L, by applying pulses 1 to 8 as in FIGS. 7A, 7B, 7G and 7H and at that time enabling the UPPER ENABLE signal, the 1st to 16th heaters 73 as well as the 33rd to 48th heaters 73 can be driven. Afterward, by enabling the LOWER ENABLE signal, the 17th to 34th heaters 73 and the 49th to 64th heaters 73 can be driven. A period is provided between each data latch signal in FIG. 10A to compensate for motor fluctuation or jitter.

As shown in FIG. 8(A), that result produces an image in which landed positions of ink discharged from nozzles 1 to 32 are shifted according to printing timing. Then, if the printing head is inclined beforehand according to a difference of printing timings, it is possible to print at accurate positions 20 as shown in FIG. 8(B).

Figures 12A, 12B, 12C, 12D, 12E, 12F, 12G, 12H, 12I, 12J, 12K, 12L, 12M, 12N, 12O, 12P, 12Q, 12R:
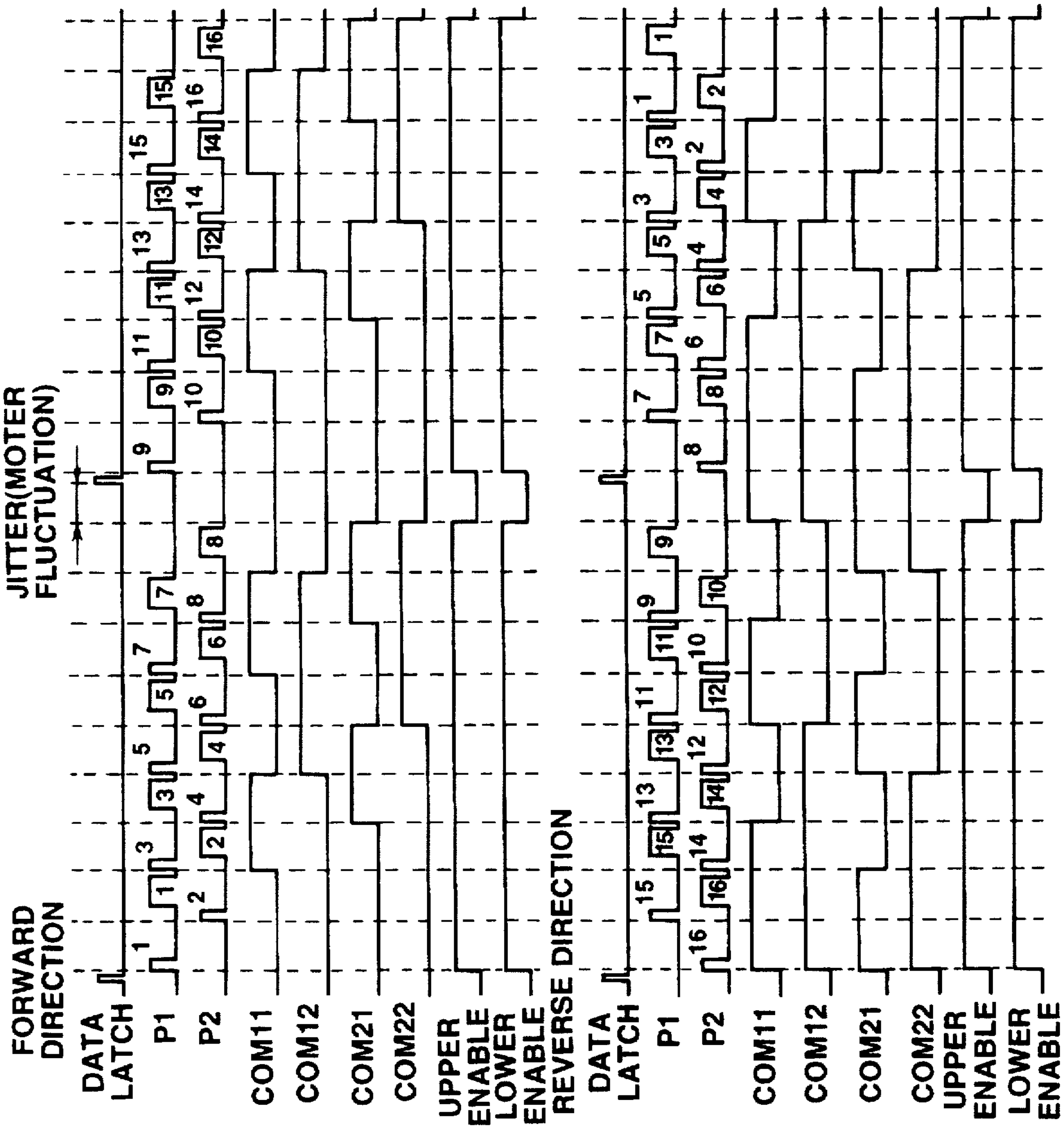
FIGS. 12A–12R comprise a drive timing chart at a high resolution recording for the recording head shown in FIG. 9.

In drive timing in the second mode which is recording at high resolution is shown in FIGS. 12A–12R. In FIGS. 12A–12R, during pulses 1 to 8 and during pulses 9 to 16 by enabling the UPPER ENABLE signal and the LOWER ENABLE signal, it is possible to print at double resolution.

While nozzles 1 to 16 are driven during pulses 1 to 8 in the first mode, in addition, nozzles 17 to 32 can be driven in the second mode. Afterward, nozzles 1 to 16 as well as nozzles 17 to 32 are driven during pulses 9 to 16. As a result, nozzles 1 to 16, 17 to 32, 33 to 48, and 49 to 64 are driven in a same period.

Figures 11A, 11B:
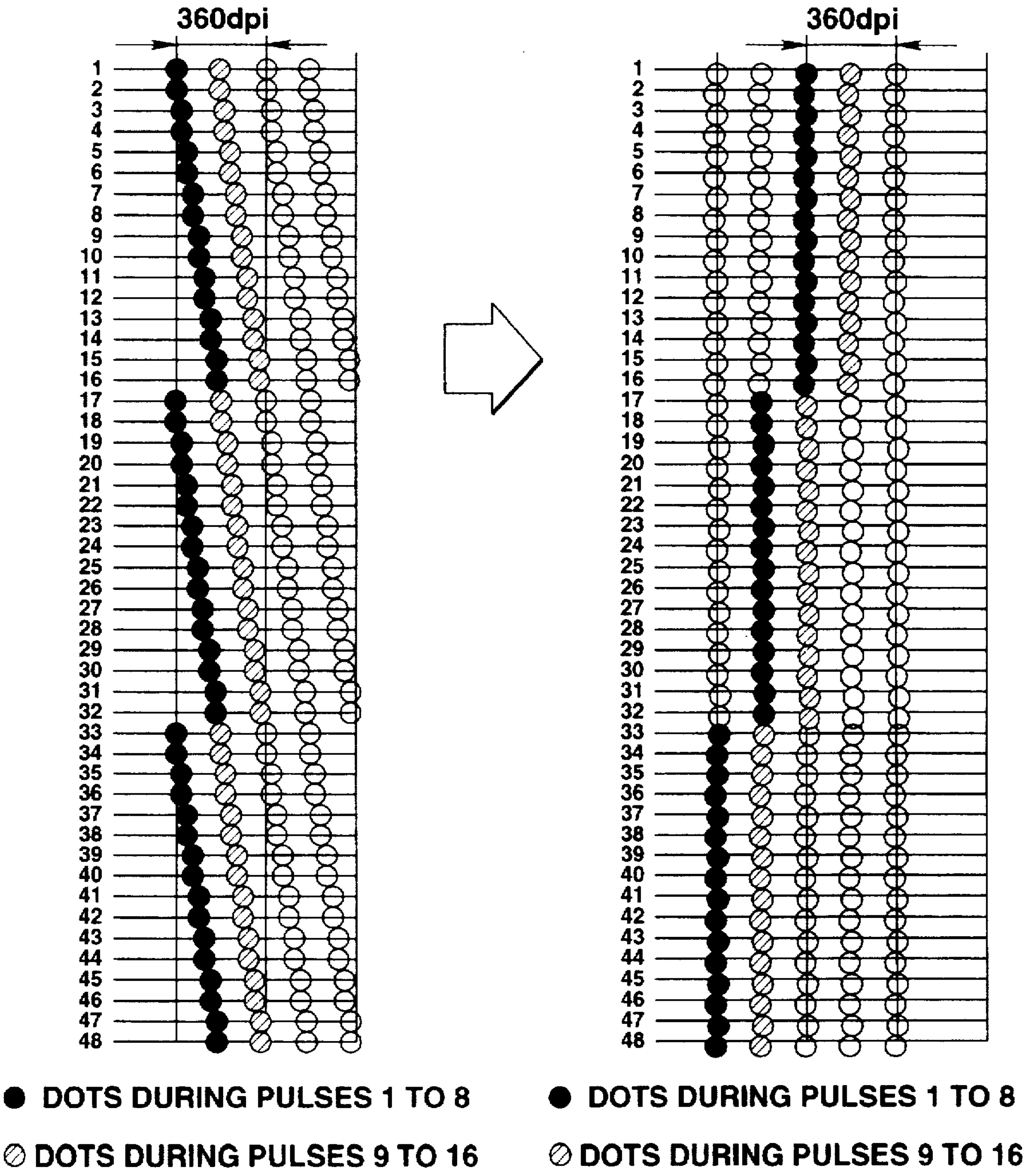
FIGS. 11(A) and 11(B) are schematic views showing ink landed positions at a high resolution recording of the recording head shown in FIG. 9.

Printing landed spots can be in two rows in the second mode as shown in FIG. 11(A), although they are in one row in the first mode. In other words, it is possible to record in the second mode at twice the resolution as in the first mode. Since the head is inclined in fact, recording can be effected as shown in FIG. 11(B).

By having plural driver circuits in the printing head and driving plural driver circuits simultaneously, it is possible to triple or quadruple resolution.

According to the embodiment as mentioned above, the drive circuit can drive plural blocks independently, so it is possible to drive the preheat pulse and the main heat pulse efficiently and to shorten the drive time.

In addition, by simultaneously driving the blocks which can be driven independently, it is possible to achieve high resolution.

Further, the ink jet recording apparatus using heating elements as recording elements is an example of a recording apparatus, but the present invention is not limited to that.

The present invention can be applied to other recording apparatuses such as a thermal recording apparatus using heating elements, an LED recording apparatus using LED elements, and an impact recording apparatus using wire elements as recording elements.

Typical structures and operational principles of such devices to which the present invention can be applied, can preferably be such as those disclosed in U.S. Pat. Nos. 4,723,129 and 4,740,796. Those principles and structures are applicable to a so-called on-demand type recording system and to a continuous type recording system, but are particularly suitable for the on-demand type. Such an approach adopts the principle that at least one driving signal is applied to an electrothermal transducer disposed on a liquid (ink) retaining sheet or in a liquid passage, the driving signal being sufficient to provide a quick temperature rise beyond a departure-from-nucleation boiling point. The thermal energy provided by the electrothermal transducer produces film boiling on the heating portion of the recording head, whereby a bubble can be formed in the liquid (ink), in response to each driving signal. The production, development and contraction of the bubble cause ejection of the liquid (ink) through an ejection outlet to produce at least one droplet. The driving signal is preferably in the form of a pulse, because this enables the development and contraction of the bubble to be effected instantaneously, and therefore, the liquid (ink) is ejected with quick response to the driving signal. The pulse-shaped driving signal is preferably formed as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600, wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application No. 59-123670, wherein a common slit is used as the ejection outlet for plural electrothermal transducers, and to the structure disclosed in Japanese Laid-Open Patent Application No. 59-138461, wherein an opening for absorbing pressure waves of the thermal energy is formed corresponding to the ejecting portion. This is because the present invention is effective to perform recording with certainty and at high efficiency regardless of the type of recording head.

In addition, the present invention is applicable to a serial type recording head wherein the recording head is fixed on the main assembly, to a replaceable chip type recording head which is connected electrically with the main apparatus and which can be supplied with the ink when it is mounted in the main assembly, or to a cartridge type recording head having an integral ink container.

Provision of recovery means and/or auxiliary means for preliminary operation is preferable, because those features can further stabilize the effects of the present invention. Examples of such means include a capping means for the recording head, cleaning means therefor, pressurizing or suction means for keeping the ink ejection outlets or orifices clean, and preliminary heating means (which may be an electrothermal transducer, an additional heating element or a combination thereof). Also, means for effecting preliminary ejection (to precede the actual recording operation) can stabilize the recording operation.

The recording head may be a single head which records using a single color ink, or may be plural heads corresponding to plural ink materials having different recording colors or densities. The present invention is effectively applied to an apparatus having at least one of a monochromatic mode (using black ink, most commonly), a multi-color mode using different color ink materials, and/or a full-color mode using a mixture of colors, which may be an integrally-formed recording unit or a combination of plural recording heads.

Furthermore, in the foregoing embodiments, the ink has been described as being liquid. It also may be an ink material which is solid below room temperature but liquid at room temperature. Since the ink is kept within a temperature range between 30° C. and 70° C., in order to stabilize the viscosity of the ink to provide stabilized ejection in the usual recording apparatus of this type, the ink may be such that it is liquid within that temperature range, whatever its phase outside that range. With one type of ink, temperature rise due to the thermal energy is positively prevented by consuming that energy for the state change of the ink from the solid state to the liquid state. Another ink material solidifies when it is left undisturbed for a certain time, thus preventing evaporation of the ink. In either of these cases, in response to application of the recording signal producing thermal energy, the ink liquefies, and the liquefied ink can be ejected. Another usable ink material may be one that starts to solidify upon reaching the recording material.

The present invention is also applicable to ink materials that are liquefied by application of thermal energy. Such an ink material may be retained as a liquid or solid material in through-holes or recesses formed in a porous sheet, as disclosed in Japanese Laid-Open Patent Application No. 54-56847 and Japanese Laid-Open Patent Application No. 60-71260. The sheet is arranged facing the electrothermal transducers. The most effective one of the techniques described above is the film boiling system.

The ink jet recording apparatus may be used as an output terminal of an information processing apparatus such as a computer or the like, as a copying apparatus when combined with an image reader or the like, or as a facsimile machine having information sending and receiving functions.

The entire disclosures of U.S. Pat. Nos. 4,740,796; 4,723,129; 4,558,333; 4,463,359; 4,459,600 and 4,345,262, and those of Japanese Laid-Open Patent Application Nos. 54-56847, 59-123670, 59-138461 and 60-71260, are incorporated herein by reference.

While the invention has been described with reference to the preferred structures disclosed herein, it is not confined to the details set forth above; to the contrary, many modifications and variations thereof will be readily apparent to those skilled in the art, and this application is intended to cover all such modifications or changes as may come within the purposes of the disclosed improvements disclosed above, within the scope of the following claims.

We claim:

1. A recording head operable in first and second modes, said recording head comprising:

plural recording elements divided into plural blocks and the plural blocks being divided into plural groups, each group having more than one block; and a driving circuit for driving each of the plural blocks independently, wherein said driving circuit drives the plural groups at a different timing in the first mode and drives the plural groups at a same timing in the second mode.

2. A recording head according to claim 1, wherein said driving circuit outputs at least one pulse signal and plural block select signals.

3. A recording head according to claim 2, wherein said driving circuit outputs a first enable signal and a second enable signal as the plural block select signals to drive the plural groups independently.

4. A recording head according to claim 3, wherein said driving circuit drives the first enable signal and the second enable signal at a different timing in the first mode, and drives the first enable signal and the second enable signal at a same timing in the second mode.

5. A recording head according to claim 1, wherein recording is effected by discharging a recording liquid.

6. A recording head according to claim 5, wherein the recording liquid is discharged by using thermal energy.

7. A recording head cartridge comprising:

a recording head operable in first and second modes and including plural recording elements divided into plural blocks and the plural blocks being divided into plural groups, each group having more than one block, and a driving circuit for driving each of the plural blocks independently, wherein said driving circuit drives the plural groups at a different timing in the first mode and drives the plural groups at a same timing in the second mode, and wherein recording is effected by discharging a recording liquid from a liquid path by using thermal energy; and a container for holding the recording liquid to be supplied to said liquid path.

8. A recording head cartridge according to claim 7, wherein said container is filled with the recording liquid.

9. A recording apparatus operable in first and second modes for recording an image using a recording head having plural recording elements divided into plural blocks and the plural blocks being divided into plural groups, each group having more than one block, said recording apparatus comprising:

a driver for driving each of the plural blocks independently; and a drive controller for controlling said driver to drive the plural groups at a different timing in the first mode and to drive the plural groups at a same timing in the second mode.

10. An apparatus according to claim 9, wherein said driver outputs at least one pulse signal and plural block select signals.

11. An apparatus according to claim 10, wherein said driver outputs a first enable signal and a second enable signal as the plural block select signals to drive the plural groups independently.

12. An apparatus according to claim 11, wherein said driver drives the first enable signal and the second enable signal at a different timing in the first mode, and drives the first enable signal and the second enable signal at a same timing in the second mode.

13. An apparatus according to claim 9, wherein said recording head effects recording by discharging a recording liquid.

14. An apparatus according to claim 9, wherein the plurality of recording elements comprises heating elements to generate thermal energy upon being driven.

15. An apparatus according to claim 14, wherein said recording head discharges the recording liquid byusing thermal energy.

16. An apparatus according to claim 9, wherein said driver outputs plural pulse signals, and said drive controller controls said driver to supply the plural pulse signals at different and non-overlapped timings.

17. An apparatus according to claim 9, further comprising a temperature controller for controlling a temperature of the recording head.

18. An apparatus according to claim 17, wherein said temperature controller controls the temperature by adding a preheat pulse to a main heat pulse of the pulse signals.

19. An apparatus according to claim 9, further comprising a scanning section for scanning the recording head along a main scanning direction.

20. An apparatus according to claim 19, wherein said drive controller controls said driver to drive the plural groups at the same timing in the second mode so as to drive the recording head to record at a higher resolution with respect to the main scanning direction than a resolution recorded in the first mode.

21. An apparatus according to claim 19, wherein said recording head is inclined with respect to the main scanning direction.

22. An apparatus according to claim 9, further comprising the recording head.

23. An apparatus according to claim 9, further comprising a plurality of recording heads, wherein said recording heads record in respectively different colors.

24. An apparatus according to claim 9, wherein said recording apparatus is utilized as an output terminal for a computer.

25. An apparatus according to claim 9, further comprising an image scanner to provide image data to be recorded by the recording head, such that said recording apparatus can function as a copying machine.

26. An apparatus according to claim 9, further comprising an image scanner to provide image data and a data transmitting and receiving unit for transmitting the image data to a recipient at another location and for receiving image data from another machine, such that said recording apparatus can function as a facsimile machine.

27. An apparatus according to claim 9, further comprising transport means for transporting a recording medium onto which the image formed by the recording head is recorded.

28. A recording method for recording an image using a recording head having plural recording elements divided into plural blocks and the plural blocks being divided into plural groups, each group having more than one block, said recording method comprising the steps of:

providing a driver for driving each of the plural blocks independently;

controlling the driver to drive the plural groups at a different timing in a first mode; and controlling the driver to drive the plural groups at a same timing in a second mode.

29. A method according to claim 28, wherein in said first controlling step the driver is controlled to drive the plural groups by supplying a first enable signal and a second enable signal at the different timing in the first mode, and said second controlling step controls the driver to drive the plural groups by supplying the first enable signal and the second enable signal at the same timing in the second mode.

30. A method according to claim 28, further comprising the step of providing a scanning section for scanning the recording head along a main scanning direction, wherein said second controlling step controls the driver to drive the plural groups at the same timing in the second mode so as to drive the recording head to record at a higher resolution with respect to the main scanning direction than a resolution recorded in the first mode.

31. A recording head operable in first and second modes, said recording head comprising:

plural recording elements divided into at least four blocks, each block belonging to either an upper group or a lower group; and a driving circuit for driving odd blocks and even blocks of the at least four blocks independently, wherein said driving circuit drives the upper and lower groups at a different timing in the first mode and drives the upper and lower groups at a same timing in the second mode.

32. A recording head according to claim 31, wherein said driving circuit outputs an upper enable signal and a lower enable signal for enabling the upper and lower groups, respectively.

33. A recording head according to claim 31, wherein said driving circuit comprises a first circuit for driving odd blocks in a time divisional manner and a second circuit for driving even blocks in the time divisional manner, said first and second circuits being operable independently.

34. A recording head according to claim 33, wherein each of said first and second circuits comprises a decoder for selecting one of the blocks to be driven based on a selection signal.

35. A recording method operable in first and second modes, said recording method comprising the steps of:

dividing plural recording elements of a recording head into at least four blocks, each block belonging to either an upper group or a lower group; and driving odd blocks and even blocks of the at least four blocks independently, wherein the upper and lower groups are driven at a different timing in the first mode and the upper and lower groups are driven at a same timing in the second mode.

36. A recording method according to claim 35, wherein in said driving step an upper enable signal and a lower enable signal for enabling the upper and lower groups, respectively, are outputted.

37. A recording method according to claim 35, wherein said driving step utilizes a first circuit for driving odd blocks in a time divisional manner and a second circuit for driving even blocks in the time divisional manner, the first and second circuits being operable independently.

38. A recording method according to claim 37, wherein each of the first and second circuits comprises a decoder for selecting one of the blocks to be driven based on a selection signal.

* * * * *

UNITED STATES PATENT AND TRADEMARK OFFICE

CERTIFICATE OF CORRECTION

PATENT NO. : 5,896,146

DATED : April 20, 1999

INVENTOR(S) : MURATA ET AL.

It is certfied that error appears in the above-identified patent nd that said Lettters Patent is hereby corrected as shown below:

COLUMN 6:
Line 35, "20" should be deleted.

COLUMN 9:
Line 59, "byusing" should read --by using--.

Signed and Sealed this

Thirtieth Day of November, 1999

Attest:

Q. TODD DICKINSON

Attesting Officer

*Acting Commissioner of Patents and Trademarks*